United States Patent
Becker et al.

(10) Patent No.: US 7,966,900 B2
(45) Date of Patent: Jun. 28, 2011

(54) ACTUATOR FOR A MOTOR VEHICLE, MORE SPECIFICALLY FOR A MOTOR VEHICLE SEAT

(75) Inventors: Burckhard Becker, Solingen (DE); Thomas Arndt, Monheim (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 455 days.

(21) Appl. No.: 11/895,068

(22) Filed: Aug. 22, 2007

(65) Prior Publication Data
US 2008/0047377 A1   Feb. 28, 2008

(30) Foreign Application Priority Data

Aug. 25, 2006   (DE) .......................... 10 2006 039 809
Jun. 29, 2007   (DE) .......................... 10 2007 030 445

(51) Int. Cl.
*F16H 3/06* (2006.01)
*F16H 55/18* (2006.01)
(52) U.S. Cl. .......................... 74/89.23; 74/89.42; 74/441
(58) Field of Classification Search ................ 74/89.14, 74/89.23, 89.34, 89.42, 425, 441
See application file for complete search history.

(56) References Cited

U.S. PATENT DOCUMENTS

| | | | | |
|---|---|---|---|---|
| 2,567,483 A | * | 9/1951 | Hotine | 74/441 |
| 3,617,021 A | | 11/1971 | Littmann | |
| 4,434,677 A | * | 3/1984 | Linley, Jr. | 74/409 |
| RE32,433 E | * | 6/1987 | Erikson et al. | 74/441 |
| 5,473,958 A | | 12/1995 | Jeck et al. | |
| 6,073,893 A | | 6/2000 | Koga | |
| 6,322,146 B1 | | 11/2001 | Fisher, Jr. | |
| 2001/0018850 A1 | * | 9/2001 | Walton | 74/89.44 |
| 2004/0206195 A1 | * | 10/2004 | Landskron et al. | 74/89.14 |

FOREIGN PATENT DOCUMENTS

| | | |
|---|---|---|
| EP | 588 812 B1 | 12/1995 |
| WO | WO 86/06036 A1 | 10/1986 |
| WO | WO 92/22439 A1 | 12/1992 |
| WO | WO 03/068551 A1 | 8/2003 |

* cited by examiner

*Primary Examiner* — Thomas R Hannon
*Assistant Examiner* — Phillip A Johnson
(74) *Attorney, Agent, or Firm* — McCarter & English, LLP

(57) ABSTRACT

An actuator for a motor vehicle with an electric motor having an output shaft, a gearbox that is connected to the output shaft that includes a spindle nut, and a spindle that engages the spindle nut. The spindle nut comprises one main portion and at least one axial socket. The axial socket: (a) is solidly connected to the main portion, more specifically is integral with the main portion, (b) comprises an internal thread cooperating with the spindle and (c) is configured to be radially elastic. An elastic element is provided which fits against the axial socket and pushes the internal thread thereof into engagement with the spindle.

22 Claims, 3 Drawing Sheets

US 7,966,900 B2

ACTUATOR FOR A MOTOR VEHICLE, MORE SPECIFICALLY FOR A MOTOR VEHICLE SEAT

CROSS REFERENCE TO RELATED APPLICATIONS

This application claims priority to German Application No. DE 10 2006 039 809.2, filed Aug. 25, 2006, and German Application No. DE 10 2007 030 445.7, filed Jun. 29, 2007, both of which are expressly incorporated by reference in their entirety as part of the present disclosure.

BACKGROUND

The invention relates to an actuator for a motor vehicle, more specifically for a motor vehicle seat, according to the preamble of patent claim 1. Such an actuator has been known from WO 03/068551 A1 and also from U.S. Pat. No. 3,617,021 A and from WO 86/06036. Additionally, the reader is referred to U.S. Pat. No. 6,073,893 A and to U.S. Pat. No. 6,322,146 B1.

The disadvantage of such actuators is that a certain clearance between spindle nut and spindle is unavoidable. This clearance is noticeable in practical use, for example during a change in the drive direction. Attempts have been made to make actuators of the type mentioned herein above having zero clearance. The reader is referred for example to the document EP 588 812 B1 which describes a spindle drive the spindle of which is motor rotated. It proposes two separate spindle nuts one of which fits against the left thread collars of the spindle thread and the other against the right thread collars of the spindle thread.

The invention aims at indicating an implementation of an actuator that is easy to realize in terms of construction and that comprises a zero clearance interaction, more specifically a zero clearance adjustable interaction, between the spindle nut and the spindle.

SUMMARY

The object is solved by providing an actuator for a motor vehicle including an electric motor having an output shaft, a gearbox that is connected to the output shaft and includes a spindle nut, and a spindle that engages the spindle nut. The spindle nut comprises a main portion and at least one axial socket. The axial socket: (a) is solidly connected to the main portion, (b) comprises an internal thread cooperating with the spindle and (c) is configured to be radially elastic. The actuator further includes an elastic element that fits against the axial socket and pushes the internal thread thereof into engagement with the spindle. In one aspect, the axial socket is integral with the main portion.

In accordance with the invention, there is provided at least one axial socket, one axial socket being preferably associated with the two axial ends of the spindle nut. The axial socket is preferably made integral with the spindle nut. The spindle nut may be made from metal and/or from plastic material.

The invention allows for a simple solution for zero clearance cooperation between the spindle nut and the spindle. In the region of the at least one axial socket, the elastic element urges the internal thread of the socket so far into the thread turns of the spindle that the flanks fit against each other on either side and that a zero clearance fit is achieved.

Generally speaking, what is achieved is that the functions of the spindle nut are distributed. The main portion absorbs the crash forces, the at least one axial socket is responsible for the zero clearance fit. The afore the applies in essence, for the axial socket also contributes to a certain extent to absorbing crash forces, although significantly less than the main portion.

The axial socket is preferably at least twice as elastically deformable in the radial direction as the main portion under the action of a radial force K.

In a preferred configuration, the at least one axial socket is solidly connected to the main portion. When made from plastic, the two are injection-molded together or made together in another way, when made from metal, the axial socket preferably has at least one slot for it to be sufficiently elastically deformable. In principle, such type slots are also suited for other materials and configurations of the axial socket.

The elastic element urges the axial socket into engagement with the thread of the spindle. This is how the zero clearance fit is achieved. The elastic element acts preferably over the entire circumference. It is sufficient that the axial socket is urged at one point so far into the thread turns of the spindle that a zero clearance fit is achieved there.

Preferably, the internal thread of the axial socket is made in one work step together with the inner thread of the main portion. Preferably, the two threads are disposed continuously one behind the other and are continuous.

Preferably, the axial socket has a smaller outer diameter than the main portion, more specifically an outer diameter amounting at the most to only about 80%, preferably only about 50% thereof. Between the axial socket and the main portion there is preferably located a step that may be used for accommodating a bearing, more specifically a ball bearing.

The spindle nut preferably has a toothed external surface feature that is provided only in the main portion and not on the axial socket. It is thereby preferred that the external surface feature is a worm wheel.

BRIEF DESCRIPTION OF THE DRAWINGS

Other features and advantages will become more apparent upon reviewing the appended claims and the following non restrictive description of embodiments of the invention, given by way of example only with reference to the drawing. In the drawing:

DETAILED DESCRIPTION

Figure 1:
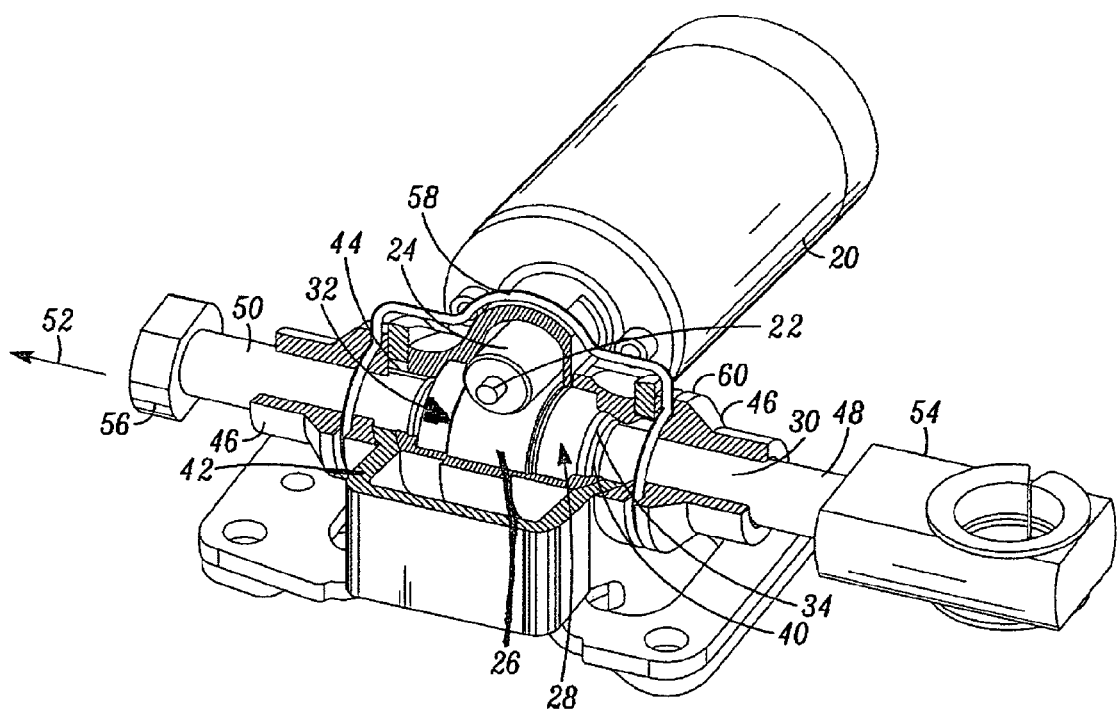
FIG. 1 shows a perspective illustration of a partially sectioned actuator of the invention.

FIG. 1 shows a first exemplary embodiment and illustrates an electric motor 20 having an output shaft 22. A worm 24, which meshes a worm wheel 26, is non-rotatably connected thereto. This worm wheel 26 is part of a spindle nut 28 that engages a spindle 30. In operation, the spindle 30 is not rotated by the electric motor 20. The described parts 24 through 30 form a two-stage gearing comprising a worm gearing and a spindle gearing mechanism. The arrangement described is state of the art.

Figure 2:
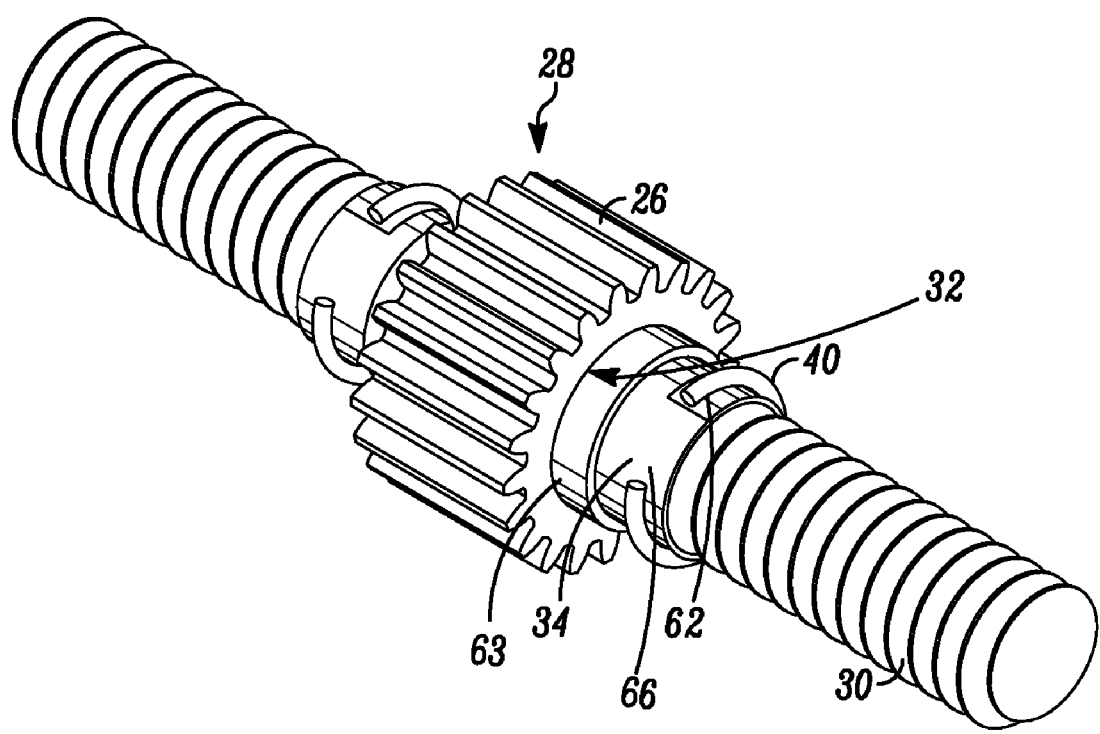
FIG. 2 shows a perspective illustration of a combination of spindle and spindle nut similar to the configuration shown in FIG. 1, but now with recesses.
Figure 3:
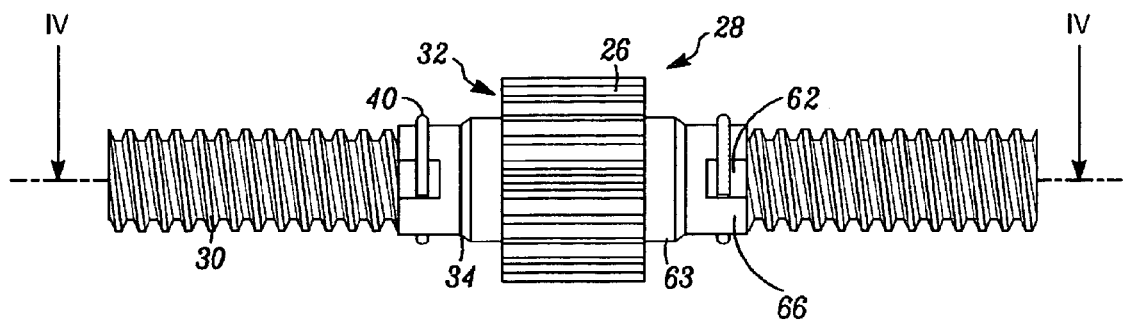
FIG. 3 shows a top view of a combination shown in FIG. 2.
Figure 4:
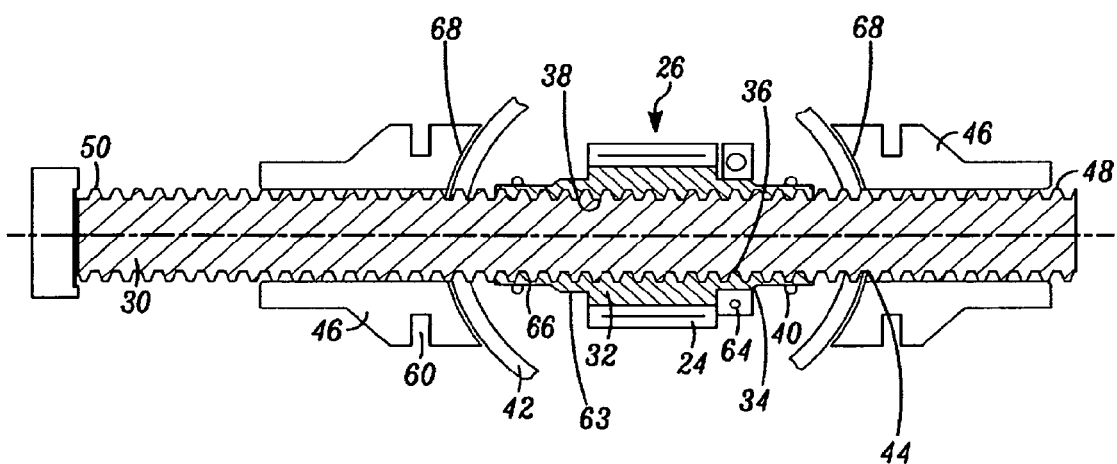
FIG. 4 shows an axial sectional view taken along section line IV-IV in FIG. 3.

The spindle nut 30 has a main portion 32 that carries the worm wheel 26 on its circumference. Insofar, the spindle nut 28 does not differ from prior art. Still, there is a difference which is that there is provided an axial socket 34 on either of the two axial ends of the main portion 32, the socket having an outer diameter that is significantly smaller than that of the main portion 32. The axial socket 34 is solidly connected to the main portion 32; in the concrete embodiment according to FIG. 1, it is integral with the main portion 32. As can be seen from FIG. 4, which also applies to FIG. 1, the main portion has in a known way an inner thread 36 that engages with the thread of the spindle 30. The axial sockets 34 each have an internal thread 38 that also cooperates with the spindle 30 and engages with the thread turns thereof. The axial sockets 34 are configured to be elastic in the radial direction, meaning they can be pushed more or less onto the spindle 30. An elastic element 40 in the form of a ring-shaped spring is provided, the elastic element forming a surrounding grip around the respective associated axial socket 34, as can be seen from the FIGS. 2 through 4 showing the second exemplary embodiment as well as from FIG. 1. This elastic element 40 abuts the axial socket 34 and pushes at least a partial portion of this axial socket 34 in such a manner against the spindle that the internal thread 38 engages the thread turns of the spindle 32 with, as far as possible, zero clearance. It forms an almost entirely surrounding grip around the axial socket 34 and also encircles the spindle 30.

The parts 24 through 28, and in parts the spindle 30, are disposed in a gear housing 42 that is shown in a partial sectional view in FIG. 1. It has opposite openings 44 for passage of the spindle 30. In the portion of these openings 44 there are affixed protective parts 46 which partially enclose the spindle 30, with very little clearance but freely, and protect it from dirt. They have a cylindrical inner wall with an inner diameter that corresponds to the diameter of the addendum circle of the spindle 30 plus one to three tenths of a millimeter. At need, the protective part 46 is provided on its inner wall with a cleaning device, e.g., flocked with fibers.

As can be seen from FIG. 1, outside of the protective parts 46 there are unprotected portions 48, 50 where the spindle 30 is freely accessible and also freely visible in FIG. 1. The axial length of each unprotected portion 48, 50 is smaller than the axial length of the protective parts 46. The arrangement is chosen such that the position of the spindle 30 shown in FIG. 1 is the central position. If the electric motor 20 is actuated in one direction of rotation, it transports the spindle 30 in one direction, it being hypothesized that it transports it leftward pursuant to arrow 52 in FIG. 1. This movement is only possible up to the point at which a fastening portion 54, which is solidly connected to the spindle 30, strikes the free end of the neighboring protective part 46. In this condition, the unprotected portion 48 has migrated inside the protective part 46, as it can be seen from FIG. 1, but it has not come into contact with the spindle nut 28.

If the direction of rotation of the electric motor 20 is reversed, the same processes occur in the other direction, now a holding portion 56, which is also connected to the spindle 30, abuts the end of the left protective part 46 so that the movement is stopped. In this condition as well, the portion 50, which is unprotected in FIG. 1, has not been displaced far enough to come into contact with the spindle nut 28. Accordingly, the spindle nut 28 generally comes only into contact with protected thread portions. These protected portions cannot be contaminated with dust, dirt or other particles and remain clean. In particular motor vehicles that are used for a longer period of time are known to have their openly accessible gear parts increasingly contaminated. This only occurs with the unprotected portions 48, 50 which are irrelevant for the functioning of the actuator.

As shown in FIG. 1, the two protective parts 46 are retained in the position shown by a bracket 58 that is substantially configured in a U shape and forms a surrounding grip around the top of the gear housing 42. For this purpose, they have a groove 60 for lateral arms of the elastic bracket 58 made from wire to engage.

The second exemplary embodiment shown in the FIGS. 2 through 4 is not shown completely, these figures only showing the combination of spindle nut 28 and spindle 30 as well as the protective parts 46 that are illustrated in FIG. 4. The difference from the first exemplary embodiment is that the axial socket 34 now has a recess 62 that may also be configured to be a slot, a bight portion, a hole or a notch. The radial elasticity of the axial socket 34 is increased as a result thereof. It is possible to make the spindle nut 28 from metal, at least in parts from metal.

As shown in particular in FIG. 4, the axial socket 34 is quite thin, in any case significantly thinner than the main portion 32. There, there is sufficient resistant material between the thread turns of the spindle 30 and the worm wheel 26. In this portion, the spindle nut is configured like a prior art spindle nut 28, meaning it can absorb crash forces. In the two axial sockets 34, which are built according to the same principle, the wall is quite thin, it ranges from 1 through 3 mm, and appropriate measures have been further taken, for example material chosen, recess 62 provided and so on, for the axial sockets 34 to be at least partially sufficiently deformable for their internal thread 38 to completely mesh the thread turns of the spindle 30 without allowing axial clearance to occur. The threads have oblique flanks, e.g. trapezoidal engagement.

In the configuration shown in the FIGS. 2 through 4, the thread of the spindle nut 28 is continuous and made in the same work step, more specifically during injection molding. In FIG. 1, the two protective parts 46 are built substantially according to the same principle and have more specifically the same axial length. The axial length corresponds to about 65% of the axial length of the spindle nut 28 and ranges from 40 to about 80% of this axial length.

As shown in the FIGS. 2 through 4 in particular, the axial socket 34 has a cylindrical intermediate piece 63 commencing at the main portion 32 and an outer portion 66 extending outward therefrom. It is this outer portion 66 that performs the function of compensating for the clearance. The intermediate piece 63 is slightly thicker than the outer portion 66. The intermediate piece 63 is in particular suited for receiving a bearing 64 that abuts the gear housing 42.

As shown in FIG. 4, each protective part 46 has an abutment surface 68 by which it contacts the gear housing. This abutment surface is limited either by a cylinder the cylinder axis of which passes through the centre of the spindle nut 28 and extends either parallel to the output shaft 22 or perpendicularly to the output shaft or by a ball the centre of which is in the center of the spindle nut 28. Partially cylindrical outer surfaces or ball surfaces configured accordingly and mating the abutment surfaces 68 are provided on the gear housing 22. Together with the protective parts 46, the spindle 30 can be pivoted about this cylinder axis or about the center of the ball within a certain pivot range.

What is claimed is:

1. An actuator for a motor vehicle comprising:
   an electric motor having an output shaft;
   a gearbox that is connected to the output shaft and includes a spindle nut;
   a spindle that engages the spindle nut, wherein the spindle nut comprises a main portion being defined by radial end faces and at least one axial socket, the axial socket (a) is solidly connected to the main portion, (b) comprises an internal thread cooperating with the spindle and (c) comprises a cylindrical intermediate piece commencing at the main portion and an outer portion extending outward from the cylindrical intermediate piece, the outer portion is configured to be radially elastic;

an elastic element that fits against the axial socket and pushes the internal thread thereof into engagement with the spindle; wherein the elastic outer portion extends around the entire circumference of the spindle, at least one recess is provided in the outer portion of the axial socket, and the at least one recess does not extend into an area between the end faces; and a gear housing having opposite openings for passage of the spindle, wherein the spindle nut is disposed in the gear housing.

2. The actuator as set forth in claim 1, wherein the main portion comprises an inner thread that is built according to the same principle as the internal thread and continues the internal thread.

3. The actuator as set forth in claim 1, wherein the elastic element is at least partially annular.

4. The actuator as set forth in claim 1, wherein the main portion has a larger outer diameter than the axial socket.

5. The actuator as set forth in claim 1, wherein there is provided at least one bearing that abuts the circumference of the axial socket.

6. The actuator as set forth in claim 1, wherein the main portion has an inner thread and that the internal thread is continuously connected without interruption to the inner thread.

7. The actuator as set forth in claim 1, wherein the axial socket is longer or shorter than the main portion in the axial direction.

8. The actuator as set forth in claim 1, wherein the spindle comprises a spindle thread, the spindle thread and the internal thread each define thread peaks, thread valleys and thread flanks, and that the internal thread and the spindle thread are matched so that, when the internal thread is pushed into the spindle thread, the thread flanks abut first before the thread peaks of the one thread come into abutment with the thread valleys of the other thread.

9. The actuator as set forth in claim 1, wherein the spindle nut comprises a toothed external surface and that the toothed external surface is only disposed in the main portion and not on the axial socket.

10. The actuator as set forth in claim 1, wherein the actuator is an actuator for a motor vehicle seat.

11. The actuator as set forth in claim 1, wherein the axial socket is integral with the main portion.

12. The actuator as set forth in claim 1, wherein there is provided at least one bearing that fits laterally against the main portion.

13. The actuator as set forth in claim 1, wherein at least one axial recess is provided in the axial socket.

14. The actuator as set forth in claim 1, wherein the at least one recess is provided in an outer surface of the outer portion of the axial socket.

15. The actuator as set forth in claim 1, wherein the intermediate piece is thicker than the outer portion.

16. The actuator as set forth in claim 1, wherein a bearing is provided, the bearing is received on the intermediate piece and abuts the gear housing.

17. The actuator as set forth in claim 1, wherein an end of the elastic element contacts the recess.

18. The actuator as set forth in claim 1, wherein the recess is an area of the outer portion having reduced wall thickness.

19. The actuator as set forth in claim 1, wherein the recess does not extend into the cylindrical intermediate piece.

20. An actuator for a motor vehicle comprising:
an electric motor having an output shaft;
a gearbox that is connected to the output shaft and includes a spindle nut;
a spindle that engages the spindle nut, wherein the spindle nut comprises a main portion being defined by radial end faces and at least one axial socket, the axial socket (a) is solidly connected to the main portion, (b) comprises an internal thread cooperating with the spindle and (c) comprises a cylindrical intermediate piece commencing at the main portion and an outer portion extending outward from the cylindrical intermediate piece, the outer portion is configured to be radially elastic;
an elastic element that fits against the axial socket and pushes the internal thread thereof into engagement with the spindle; wherein the elastic outer portion extends around the entire circumference of the spindle, at least one recess is provided in the outer portion of the axial socket, wherein the main portion is designed for absorbing adjusting forces, and that the at least one axial socket absorbs less than 80% of the adjusting forces;
a gear housing having opposite openings for passage of the spindle, wherein the spindle nut is disposed in the gear housing; and
protective parts affixed in at least a portion of the openings and at least partially enclosing the spindle, wherein each protective part has an abutment surface contacting the gear housing and limited by one of a cylinder and a ball.

21. An actuator for a motor vehicle comprising:
an electric motor having an output shaft;
a gearbox that is connected to the output shaft and includes a spindle nut;
a spindle that engages the spindle nut, wherein the spindle nut comprises a main portion defined by radial end faces and at least one axial socket, the axial socket (a) is solidly connected to the main portion, (b) comprises an internal thread cooperating with the spindle and (c) comprises a cylindrical intermediate piece commencing at the main portion and an outer portion extending outward from the cylindrical intermediate piece, the outer portion is configured to be radially elastic;
an elastic element that fits against the axial socket and pushes the internal thread thereof into engagement with the spindle; wherein the elastic outer portion extends around the entire circumference of the spindle, at least one recess is provided in the outer portion of the axial socket; the at least one recess does not extend into an area between the end faces, wherein the main portion is designed for absorbing adjusting forces occurring in the event of an accident, and that the at least one axial socket absorbs less than 80% of the adjusting forces;
a gear housing having opposite openings for passage of the spindle, wherein the spindle nut is disposed in the gear housing;
protective parts affixed in at least a portion of the openings and at least partially enclosing the spindle, wherein each protective part has an abutment surface contacting the gear housing and limited by one of a cylinder and a ball; and
a bracket, wherein the protective parts are retained in position by the bracket, the bracket forming a surrounding grip around a top of the gear housing.

22. An actuator for a motor vehicle comprising:
an electric motor having an output shaft;
a gearbox that is connected to the output shaft and includes a spindle nut;

a spindle that engages the spindle nut, wherein the spindle nut comprises a main portion and at least one axial socket, the axial socket (a) is solidly connected to the main portion, (b) comprises an internal thread cooperating with the spindle and (c) comprises a cylindrical intermediate piece commencing at the main portion and an outer portion extending outward from the cylindrical intermediate piece, the outer portion is configured to be radially elastic;

an elastic element that fits against the axial socket and pushes the internal thread thereof into engagement with the spindle; wherein the elastic outer portion extends around the entire circumference of the spindle, at least one recess is provided in the outer portion of the axial socket, the recess is an area of the outer portion having reduced wall thickness, an end of the elastic element contacts the recess, and the recess does not extend into the cylindrical intermediate piece; wherein the main portion is designed for absorbing adjusting forces occurring in the event of an accident, and that the at least one axial socket absorbs less than 80% of the adjusting forces.

* * * * *